United States Patent Office 3,408,492
Patented Oct. 29, 1968

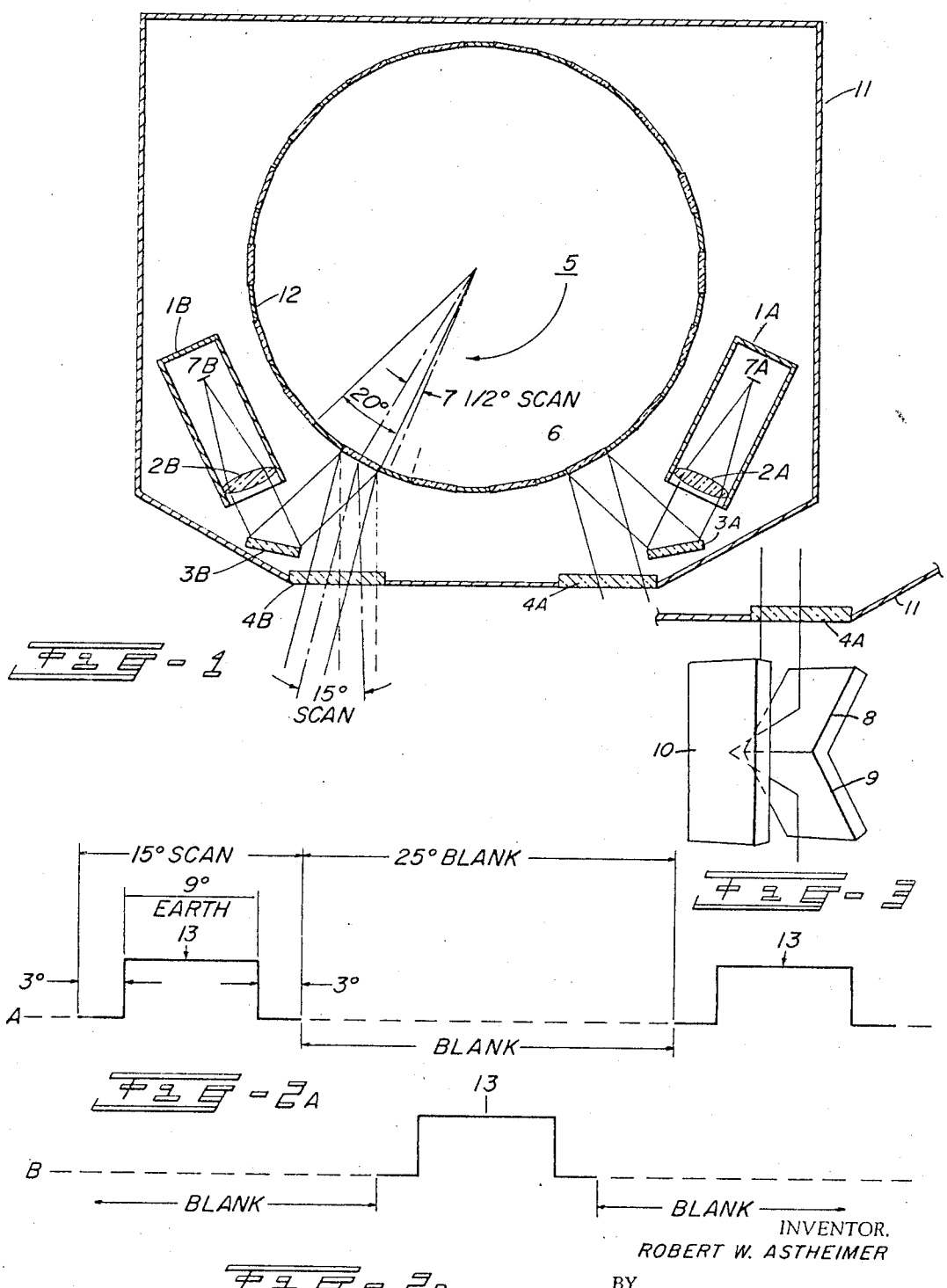

3,408,492
OPTICAL SCANNING SYSTEM FOR SCANNING ACROSS RADIATION DISCONTINUITIES
Robert W. Astheimer, Westport, Conn., assignor to Barnes Engineering Company, Stamford, Conn., a corporation of Delaware
Filed Aug. 10, 1965, Ser. No. 478,627
4 Claims. (Cl. 250—83.3)

ABSTRACT OF THE DISCLOSURE

A horizon sensor is provided with a slowly rotating drum-shaped element with a large number of mirror facets interspersed with non-reflecting facets and optics focusing the reflected, substantially parallel radiation from objects at optical infinity, onto an infrared detector. The drum turns sufficiently slowly so that slowly volatile lubricants are not necessary and so the scanner can be used on satellites which orbit in the vacuum of space.

There can be two detectors which either provide for a redundancy so that the scan is still effective if one detector and its processing circuits malfunction, or a second detector is associated with optical elements, such as mirrors or a Dove prism, which rotate the incoming radiation 90°, in which case the scanner can give information with respect to tilt about two orthogonal axes.

Background of the invention

It is common to use conical scan sensors in which a prism, such as a germanium prism is used in the infrared which is the most common case with horizon sensors, or other rotating members which produce the conical scan. A detector such as an infrared detector is in effect scanned across the disc in question. A typical and practically very reliable sensor is described in the patent to Merlen, No. 3,020,407, Feb. 6, 1962. The output of the detector is then processed in electronic circuits which measure either the width of the signal in crossing the disc or the relative widths to horizon crossings measured from a reference signal which is generated at a certain point in the scan, normally the point at which it would be in the exact center of the scan if the attitude of the vehicle showed no tilt.

In order to achieve a satisfactory scan rate and hence electronic band width in the processing circuits the rotating scanning elements have to turn quite fast, typically 30 or more times a second. Even this is a compromise with the best electrical band width and with practical instrument operating conditions. Here, however, the problems presented are quite formidable particularly for objects flying sufficiently high to be in the vacuum of space. Under such conditions and particularly after long unattended operation any lubricating greases tend to evaporate out and so lubrication presents a serious problem. For shorter operations such as, for example, rocket guidance, this problem does not arise and the Merlen horizon sensors have been extremely useful in connection with such rockets as the Agena rocket. Even apart from lubrication problems of fairly fast turning elements there is a considerable loss in energy because the electronic band width of the processing circuits represents a compromise with the ideal.

A different type of horizon sensor has been proposed and developed at least through the practical prototype stage. In this type of horizon sensor which is often referred to as an "edge tracker" an element, usually a mirror, is oscillated through a fairly small arc at the edges of the disc to be scanned. Such oscillators can be designed with torsion bars and similar suspensions that do not require lubrication. A typical sensor of this type is described in the Arck and Poor Patent 3,087,373, Apr. 30, 1963. This type of horizon sensor eliminates serious lubrication problems but requires other elements such as aiming elements to direct the instruments so that it finds a horizon and locks onto it. The aiming element can turn quite slowly and so does not present a serious lubrication problem as solid bearings begin to be practical. However, additional and quite sophisticated electronic circuits are required and the increase in circuit complication, of course, reduces reliability to a considerable extent. In other words, the edge tracking type of sensor also represents a compromise in which reduced lubrication problems are off set by other adverse factors. As a result at the present time the conical scanning type of sensor is much more commonly used.

Summary of the invention

The present invention represents an improved scanner which scans across the whole of the planetary or other disc and not just an edge and at the same time does not present a lubrication problem and permits a very greatly improved signal to noise ratio and signal strength. Essentially the present invention comprises a slowly turning drum with a number of external mirror segments, eighteen being a typical number for horizon sensor use. One or more windows are provided through which the substantially parallel rays from the distant disc pass, strike the mirror segments of the slowly rotating drum and are reflected, preferably using conventional folding mirrors, onto detector packages provided with optics which focus the incoming rays on a detector such as an infrared detector. The mirror segments are not continuous for horizon sensing purposes but are interspersed with blank segments to produce a guard band. With eighteen segments the scan angle is 15° which is satisfactory for many horizon sensors for quite high flying vehicles which, for example, may be high enough so that the scan across the earth or other disc is substantially less than 15°, in a typical case 9°.

In a preferred embodiment the instrument is provided with two windows and two detector packages which can be used in various ways. They are, of course, located so that the scans do not overlap. The use of a dual detector instrument for horizon sensing in a spinning satellite such as Tiros will first be discussed. In a spinning satellite the spin provides a second axis so that the normal requirement of separate horizon sensors for pitch and roll axes is not needed and a single scanning instrument suffices. In such a case the improved results may be analyzed as follows:

For the same rotational speed of the drum there are 18 times as many scans but each scan is quite slow so that the detector time constant may be increased by a factor of 18. As the detectivity of a detector increases as the square root of the time constant and the efficiency of the electronic circuits also increase in proportion to the square root of the electronic band width, the net effect is to increase the signal by a factor of 18, the product of the two effects. The noise is, for all practical purposes, the same, therefore, there is a comparable increase in signal to noise ratio. A slow turning mirror drum, for example making one or two revolutions a second, eliminates lubrication problems as at this slow rotation solid bearings such as nylon or Teflon can be used without lubricant.

If the second detector package is used in a scanner with the spinning satellite two important advantages are achieved. First, there is a complete redundancy thus greatly increasing the reliability. At the same time when both detector packages are operative the duty cycle is doubled, for example, from 37.5 to 75 percent. This substantially doubles the signal strength and so in this mode the improvement is 36 times instead of 18 times. On the other hand, if one package and accompanying electronics malfunctions the scanning is still as effective but with the shorter duty cycle and so the advantages of redundancy are obtained. It is an advantage of the invention in this aspect that two detectors perform both functions and it is not necessary to choose one instead of the other. The detector packages and additional windows are very light and so there is no serious weight problem which is an additional practical advantage with vehicles where weight conservation is of utmost importance. If it is desired to obtain or retain the redundancy features and additional duty cycle with a vehicle which does not spin two horizon sensors would be necessary, one for the pitch axis and the other for the roll. This is exactly analogous to the common conical scan sensors which are always provided in pairs in such cases.

In the case of vehicles which do not spin the advantages of the preferred dual detector modification of the present invention may also be utilized in another fashion by the addition of light mirrors or a Dove prism. A single sensor may scan both for pitch and roll axis, the advantage here, of course, performing both functions with a single instrument. Other combinations of utilizing the advantages of the present invention will arise in other uses. The above described organizations are intended to be typical illustrations only.

While the present invention can be used for scanning any objects at sufficient distance so they are optically at infinity with respect to the instrument optics, one of the most important fields is in horizon sensors, which are used by satellites, high flying vehicles and the like, and which scan across the disc of the earth or a similar object such as the moon or another planet. The invention will, therefore, be more particularly described in connection with such a use, but it should be understood that the advantages are also applicable to other scanning situations and that, therefore, the invention is not limited in its broader aspects to horizon sensors although in a more specific aspect this constitutes a preferred embodiment.

The present invention should not be confused with other proposed devices which utilize a drum with mirror segments or alternately a rotating prism with mirror facets. Such a device has been developed by the Daystrom Company and offered to the trade under the trademark, Infraray. The device has been proposed for measuring the width of a hot rod or strip which emits in the infrared. In such a device optics are introduced between the rotating drum or prism and the object across which scanning takes place. In other words, the beam striking the mirror facets is a converging beam and serious problems have arisen because the path length from the optics to the detector varies as a facet scans across a rod. In the fairly sharply converging beam which is required this introduces a serious defocusing and has limited the practical use of such instruments to situations where the precision required is not excessive. The present invention completely avoids any problems presented by varying path lengths because the radiation striking the mirror segments is essentially parallel and, therefore, changes in path length have no effect as no converging beam is produced until the optics of the stationary detector packages are reached. Here, of course, the path length is constant and sharp focusing is a simple matter and is retained.

Brief description of the drawings

FIG. 1 is a cross-section through an instrument showing two detector packages;

FIGS. 2A and 2B are representations of detector outputs;

FIG. 3 is a detail of a modification in which the incoming radiation for one detector package is rotated 90° to permit a single instrument to give information as to tilt about two orthogonal axes.

Description of the preferred embodiments

FIGS. 1 and 2A and 2B will first be described in conjunction with a horizon sensor for a spinning satellite or a horizon sensor for one axis only. The instrument is provided with a housing 11 containing two windows, 4A and 4B. As a number of elements are duplicated for the two detectors the letter suffix will be used for such elements. Incoming radiation from distant objections, which is substantially parallel, strikes a rotating drum 5 provided with eighteen mirror segments 6 on its outer periphery. As will be seen the mirror segments are separated by nonreflecting spaces 12. Reflection takes place and the beam through window 4A is folded by mirror 3A and focused on detector 7A by the lens 2A. This detector package is generally numbered 1A. In a similar manner the radiation entering through window 4B is folded by mirror 3B and is focused by lens 2B onto detector 7B of detector package 1B.

In the case of the radiation coming through window 4B it is shown in two positions of the drum, one in solid lines, one representing the end of a scan, and one in dashed lines showing the position at the beginning of the same scan in order to illustrate the 15° scan. The position of window 4A and the optics associated with detector package 1A is such that scanning takes place at intervals when the radiation coming through window 4B strikes as the nonreflecting segments 12 and therefore the detectors scan alternately. The blank portions in each scan caused by the segments 12 preferably correspond to 25% as opposed to the 15% scan. The geometry appears from the sectors illustrated and labelled in the drum plane in FIG. 1.

As the electronic processing circuits, which may be those described in the Merlen patent, are not changed by the present invention, they will not be described or shown in the drawings, although the output wave of the detector will be shown. Putting it another way, the present invention is primarily an optical scanning invention using conventional detectors and types of processing circuits.

The conventional electronic processing circuits receive a signal from the scan across the particular disc illustration labelled "earth" which, for the particular vehicle altitude is 9°. FIG. 2A shows the wave from detector 7A and FIG. 2B shows the wave from detector 7B. The waves are somewhat idealized as square waves but as the scan time is much longer than would be the case with a drum turning at high speed with a single scan to obtain the same electronic band width, the problem of edge effect due to limited speed of detector response is made less serious. Reference signal pickups are shown as arrows 13, the position corresponding to zero vehicle tilt.

It will be seen from FIG. 2A that the duty cycle shown is approximately 37.5 percent and the same is true of the duty cycle of detector 7B which is shown in FIG. 2B. When both detector packages are connected in parallel the two waves will be superposed and so the duty cycle will be substantially doubled. This improves reliability by reason of redundancy and adds a further factor of two to signal, and hence signal to noise ratio, when both detectors are functioning.

If it is desired to enjoy the advantages of the present invention in terms of performing two functions by a single instrument, a three-mirror element as shown in FIG. 3 is introduced into the beam to window 4A. These mirrors comprise a pair of mirrors 8 and 9 at right angles to each other and a mirror 10 at 45° to mirrors 8 and 9 is introduced. The whole arrangement is turned 45° with respect to the axis of the beam which enters 4A and this results in turning the beam 90° by reason of the operation of the optical element which turns the beam through twice the angle through which it is rotated. This beam is, therefore, received from a scan at right angles to that coming in through window 4B and accordingly, when the two scans, are properly oriented, the single sensor operates to indicate vehicle tilt about two axes such as pitch and roll.

The mirrors which constitute a beam rotating device are illustrative only. Other optical elements such as a Dove prism may be used. The prism is more rugged but it is also heavier and, therefore, the particular beam rotating means can be chosen in connection with the particular sensor requirements. Needless to say the sensor illustrated in FIGS. 1 and 3 may be duplicated if the advantages of redundancy are considered of sufficient importance to warrant such a choice.

I claim:

1. A scanning device for scanning objects sufficiently remote so that incoming radiation therefrom is substantially parallel comprising in combination and in optical alignment,
   (a) a rotating member rotated sufficiently slowly to permit solid bearings, the member having a plurality of external reflecting facets around its perimeter interspersed with non-reflecting segments,
   (b) means for permitting substantially parallel radiation from the remote objects to be scanned to strike the successive reflecting facets, and
   (c) at least one stationary radiation detector package including a radiation detector and means for focusing reflected parallel radiation from the facets onto the detector.

2. A scanning device according to claim 1 in which the radiation detector is an infrared detector.

3. A scanning device according to claim 1 in which there are provided two radiation detector packages oriented so that scans by each do not overlap whereby a double number of scans are obtained with a signal drum.

4. A horizon sensor according to claim 3 in which means are positioned in the incoming beam of parallel radiation for one of the detector packages for rotating the beam through 90°, said means including at one optical element whereby a single instrument with a single drum scans alternately about two orthogonal axes.

References Cited

UNITED STATES PATENTS

| | | | |
|---|---|---|---|
| 3,153,723 | 10/1964 | Weiss | 250—83.3 |
| 3,210,546 | 10/1965 | Perron | 250—83.3 |
| 3,277,772 | 10/1966 | Atwood | 250—236 |

RALPH G. NILSON, *Primary Examiner.*

A. B. CROFT, *Assistant Examiner.*